US010073975B2

(12) United States Patent
Ferrara et al.

(10) Patent No.: US 10,073,975 B2
(45) Date of Patent: Sep. 11, 2018

(54) APPLICATION INTEGRITY VERIFICATION IN MULTI-TIER ARCHITECTURES

(71) Applicant: INTERNATIONAL BUSINESS MACHINES CORPORATION, Armonk, NY (US)

(72) Inventors: Pietro Ferrara, White Plains, NY (US); Marco Pistoia, Amawalk, NY (US); John Ponzo, Yorktown Heights, NY (US); Omer Tripp, Bronx, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 209 days.

(21) Appl. No.: 15/234,833

(22) Filed: Aug. 11, 2016

(65) Prior Publication Data
US 2018/0046810 A1    Feb. 15, 2018

(51) Int. Cl.
G06F 21/00    (2013.01)
G06F 21/57    (2013.01)
H04L 29/06    (2006.01)

(52) U.S. Cl.
CPC ........ *G06F 21/577* (2013.01); *H04L 63/1433* (2013.01); *G06F 2221/033* (2013.01)

(58) Field of Classification Search
CPC ..................... G06F 21/577; G06F 2221/033
See application file for complete search history.

(56) References Cited

U.S. PATENT DOCUMENTS 8,949,996 B2 *   2/2015   Kalman .............. G06F 11/3684
                                                          709/203
9,306,974 B1 *   4/2016   Aziz ....................... G06F 21/56
(Continued)

FOREIGN PATENT DOCUMENTS

EP      2204755 A2     7/2010
WO    2013101083 A1    7/2013

OTHER PUBLICATIONS

Chen et al. "Oblivious Hashing—A Stealthy Software Integrity Verification Primitive," Information Hiding, 5th International Workshop, IH 2002, Noordwijkerhout, The Netherlands, Oct. 7-9, 2002 (see abstract, sections 5, 5.2).
(Continued)

*Primary Examiner* — Ali Shayanfar
(74) *Attorney, Agent, or Firm* — Intelltek Law Group, PLLC; Gabriel Daniel, Esq.

(57) ABSTRACT

A method and system of determining a vulnerability of software are provided. In a setup phase, an authorized application is received from an authorized source. Static analysis is performed to identify a plurality of structural characteristics, which are stored. During an active phase, a call is received from a user device having a target application purporting to be a version of the authorized application, during a runtime of the target application. One or more structural characteristics are selected from the plurality of structural characteristics. The user device is requested to provide the selected one or more structural characteristics from the target application. Upon determining that the report does not provide a match between the selected one or more structural characteristic of the authorized application and the target application, the version of the target application is identified to be unsecure.

18 Claims, 6 Drawing Sheets

(56) References Cited

U.S. PATENT DOCUMENTS

| | | | |
|---|---|---|---|
| 9,454,659 B1* | 9/2016 | Daymont | G06F 21/566 |
| 9,886,581 B2* | 2/2018 | Olson | G06F 21/577 |
| 2008/0163375 A1 | 7/2008 | Savagaonkar et al. | |
| 2010/0106767 A1* | 4/2010 | Livshits | G06F 21/52 |
| | | | 709/203 |
| 2010/0281248 A1* | 11/2010 | Lockhart | G06F 11/3612 |
| | | | 713/150 |
| 2011/0088095 A1 | 4/2011 | Stewart et al. | |
| 2011/0173693 A1* | 7/2011 | Wysopal | G06F 11/3612 |
| | | | 726/19 |
| 2012/0246487 A1 | 9/2012 | Gu et al. | |
| 2013/0042139 A1* | 2/2013 | Bhalerao | G06F 11/0709 |
| | | | 714/2 |
| 2013/0104239 A1 | 4/2013 | McLachlan et al. | |
| 2013/0227693 A1* | 8/2013 | Dewey | G06F 9/44 |
| | | | 726/25 |
| 2014/0337836 A1* | 11/2014 | Ismael | G06F 9/455 |
| | | | 718/1 |
| 2015/0095894 A1* | 4/2015 | Tripp | G06F 11/3612 |
| | | | 717/130 |
| 2015/0121534 A1 | 4/2015 | Zhao et al. | |
| 2015/0372980 A1* | 12/2015 | Eyada | H04L 63/1441 |
| | | | 726/1 |
| 2016/0110549 A1* | 4/2016 | Schmitt | G06F 21/577 |
| | | | 726/25 |

OTHER PUBLICATIONS

Shu et al. "Efficient Memory Integrity Verification and Encryption for Secure Processors," 36th Annual International Symposium on Microarchitecture, Dec. 3-5, 2003, San Diego, CA (see p. 2-3, 4).

\* cited by examiner

APPLICATION INTEGRITY VERIFICATION IN MULTI-TIER ARCHITECTURES

BACKGROUND

Technical Field

The present disclosure generally relates to security tools, and more particularly to tools that identify the integrity of applications in a multi-tier architecture.

Description of the Related Art

Compact, feature specific software applications, commonly referred to as "apps," have become ubiquitous on a wide array of computing devices, including laptops, smart phones, tablets, televisions, and other devices, collectively referred to herein as user devices (UD's). Many of these applications have a multi-tier architecture, sometimes referred to as "n-tier architecture," which is a client-server architecture that is separated into multiple tiers. For example, the application may be divided into three separate tiers: (i) a presentation tier, which is what a user sees; (ii) a logic tier (sometimes referred to as an application processing tier), which holds the business logic, and (iii) a data tier (sometimes referred to as a data management tier), which holds the data.

Such architecture provides security at each tier, allows scalability, and is generally easier to maintain and modify. For example, different presentation tiers may be provided for the same application depending on the device platform (e.g., PC, Tablet, smartphone, smart-watch, etc.,), different business rules may be applied to different locations, and users may have access to different data. Common applications may include, but are not limited to, online auctions, web-mail, instant messaging service, social media, and the like.

Traditional approaches for ensuring application integrity are typically related to digital signatures. While traditional approaches provide some protection, they may not provide any guarantee to servers that provide the logic tier and the data tier. A malicious version of an application can deceive a user to believe that they are interacting with a legitimate version of the application, thereby harvesting the user's personal information, such as credit card, social security number, salary information, date of birth, phone number, e-mail address, home address, etc.

A server may not be able to determine the integrity of the application being executed on the client. Consequently, a client may execute a malicious application without the server being able to identify the breach in security. It is with respect to these considerations and others that the present disclosure is written.

SUMMARY

According to various exemplary embodiments, a computing device, a non-transitory computer readable storage medium, and a method are provided to verify the integrity of an application. In a setup phase, an authorized application is received from an authorized source. Static analysis is performed to identify a plurality of structural characteristics. The plurality of structural characteristics is stored. During an active phase, a call is received from a user device having a target application purporting to be a version of the authorized application at a runtime of the target application. One or more structural characteristics are selected from the plurality of structural characteristics. The user device is requested to provide the selected one or more structural characteristics from the target application. A report is received from an analysis engine of the user device in response to the request. Upon determining that the report does not provide a match between the selected one or more structural characteristic of the authorized application and the target application, the version of the target application is identified to be unsecure. However, upon determining that the report does provide the match between the selected one or more structural characteristic of the authorized application and the target application, the version of the target application is identified to be secure.

In one embodiment, the one or more structural characteristics from the plurality of structural characteristics, are selected randomly by the security engine, in the active phase.

In one embodiment, during the setup phase, upon receiving the authorized application, a structural characteristic is injected into the authorized application and sent to the authorized source for distribution.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to security tools, and more particularly to tools that identify unsecure applications in a multi-tier architecture. Static analysis is performed to identify a plurality of structural characteristics, which are stored in a memory of a security server and/or an application reference database. During an active phase, a call is received by a security server from a user device having a target application purporting to be a version of the authorized application. This call is received during a runtime of the target application. One or more structural characteristics are selected from the plurality of structural characteristics. The user device is interrogated to provide the selected one or more structural characteristics from the target application by performing static analysis of the application. Upon determining that the report from the user device in response to the interrogation does not provide a match between the selected one or more structural characteristic of the authorized application and the target application, the version of the target application is identified to be unsecure. However, if there is a match, the target application is deemed to be secure by the security server, then the operator of the user device is allowed to continue to interact with the target application.

The techniques described herein may be implemented in a number of ways. Reference now is made in detail to the examples illustrated in the accompanying drawings and discussed below.

Example Architecture

Figure 1:
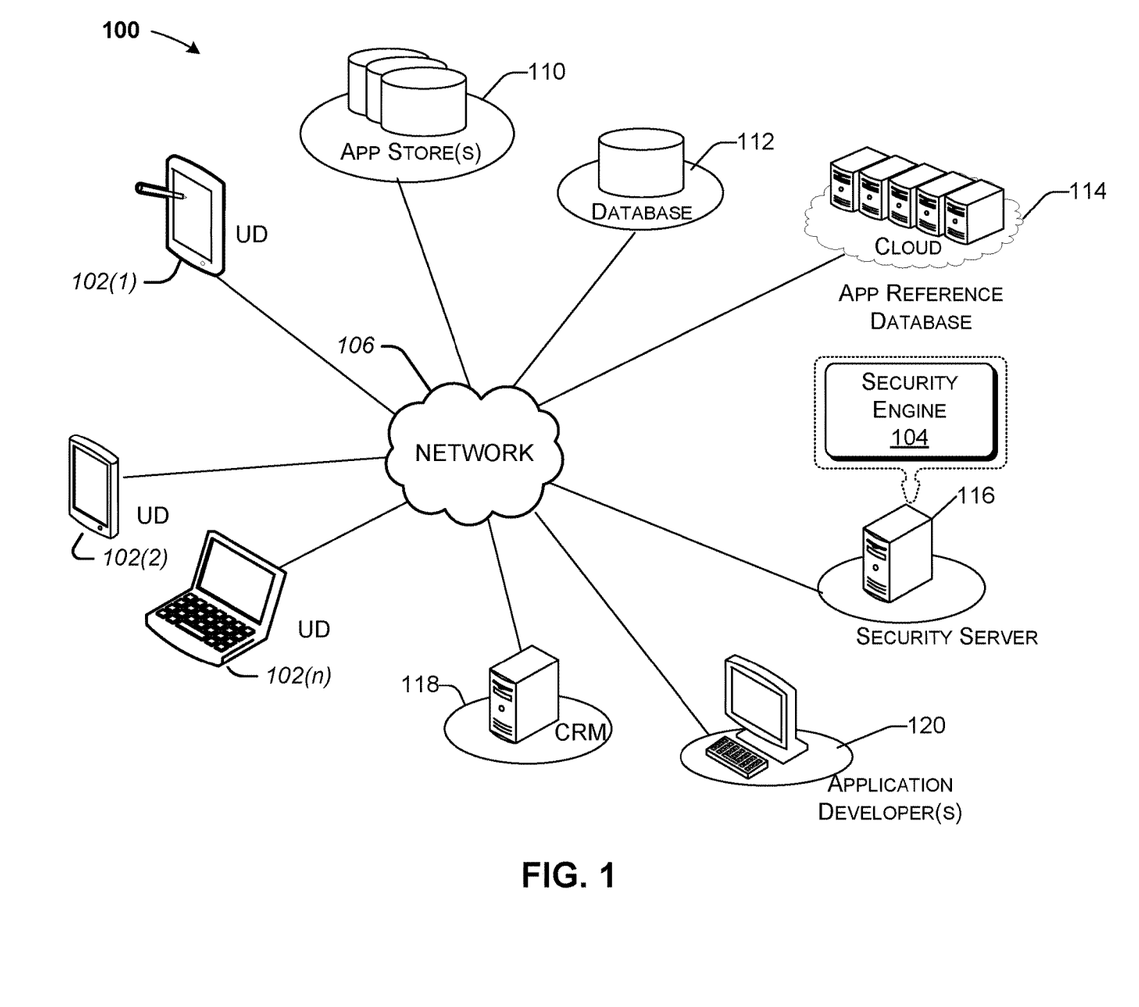
FIG. 1 illustrates an example architecture for implementing an application integrity detection system.

FIG. 1 illustrates an example architecture 100 for implementing an application integrity detection system. Architecture 100 includes a network 106 that allows various user devices 102(1) to 102(n) to communicate with each other, as well as other components that are connected to the network 106, such as one or more software application store(s) 110 and database(s) 112. There is security server 116 configured to interact with user devices that are subscribed to the security services described herein, such as user devices 102(1) to 102(n). In one embodiment, for the subscribed users, there is a customer relations management (CRM) server 118 that provides information related to these security services.

The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet, which provides various ancillary services, such as communication with various application stores, databases, and the Internet. To facilitate the present discussion, network 106 will be described, by way of example only and not by way of limitation, as a mobile network as may be operated by a carrier or service provider to provide a wide range of mobile communication services and supplemental services or features to its subscriber customers and associated mobile device users. The network 106 allows users of the application integrity verification service, directed by a security engine 104 (e.g., a software) of the security server 116, to determine whether an application stored in a memory of a user device is vulnerable to malicious activity (e.g., traffic), such as Botnet, distributed denial of service (DDoS), malware, and the like, collectively referred to herein as a security concern. Such security detection may be performed during a runtime of the subject application.

For purposes of later discussion, several user devices appear in the drawing, to represent some examples of the devices that may receive various services via the network 106. Today, user device's typically take the form of portable handsets, smart-phones, tablet computers, personal digital assistants (PDAs), smart watches, and laptops, although they may be implemented in other form factors, including consumer, and business electronic devices.

A user device (e.g., 102(1)) may have various applications stored in its memory that may have been downloaded from various application stores, represented herein by application store(s) 110. The application store(s) 110 may provide applications and updates thereof to user device's over the network 106. These applications may include multi-tier applications that interact with servers and databases, such as server 116 and database 112 for content. An operator of a user device may not be aware whether an application that is on the device is secure or has been tampered with (i.e., unsecure). To that end, application developers and authorized application stores, collectively referred to herein as authorized sources, may provide a legitimate version of the application to the security server 116 for analysis during a setup phase, described in more detail below. In one embodiment, the legitimate versions are provided to the security server 116 for analysis prior to public distribution. In various embodiments, the application store(s) 110 and/or application developer(s) 120 may provide an authorized version of the application to the security server 116 for analysis upon request from the security server 116, at predetermined intervals, and/or when a new application is introduced by a developer into the application store(s) 110.

The security server 116 is configured to provide application security services to the user device's (102(1) to 102(n)). To that end, the security engine 104 (i.e., a program running on the security server 116) is operative to receive legitimate versions of applications from various application stores 110 and application developer(s) 120. Upon receipt of a legitimate application from an authorized source, the security engine 104 of the security server 116 performs static analysis of the application to identify various structural characteristics of the code of the application, sometimes referred to shape analysis. For example, characteristics of predetermined linked data structures are identified to determine unique patterns, fingerprints, or signatures. In various embodiments, the identified characteristics may include different features, such as: a number of statements in a function (e.g., program subroutine) of the target application; a length of a call stack at a predetermined line in the application; a type and number of parameters passed to a function of the target application; a number of functions used in the target application; a number of times each function is used in the target application; an order of an invocation of each function in the target application, and the like.

In various embodiments, these results may be stored in an application reference database 114 and/or a memory of the security server 116. These entries provide a reference table of shape characteristics that may be unique to the authorized version of the target application. For each application, the reference table may include, without limitation, a name of the application and a version identifier.

In some embodiments, the security engine 104 may inject structural characteristics into the code of the application, such as an additional call to an artificial function with an arbitrary number of statements in the function to deliberately alter a shape of the target application. This modified target application may then be provided to the application store(s) 110 and/or application developers 120 for general distribution as an authorized version of the application. Later, during an active phase, if an application that purports to be a version of the target application does not include the function and/or the identical number of statements in the function (e.g., does not have the same shape as the modified target application), then the security engine 104 can identify this version to be unsecure. In some embodiments, not only are the identified structural characteristic of a target application stored in the application reference database 114 (or a memory of the security server 116), but also the actual code of the target application.

The security server 116 is configured to determine the integrity of known applications that are running on user devices 102(1) to 102(n). For example, during the active phase (i.e., after the setup phase) the security engine 104 of the security server 116 may receive a call from a user device (e.g., 102(1)) that has stored thereon a version of the application. In various embodiments, this call may be performed by an analysis engine software stored in a memory of the user device (e.g., 102(1)) or by the application in order to receive content from the security server 116 and/or database 112. The analysis engine is discussed in more detail later.

This call from the user device (e.g., 102(1)) is received by the security engine 104 during the runtime of the target application on the user device, such as user device 102(1). Upon receiving the call from the user device (e.g., 102(1)), the security engine 104 can request one or more static structural characteristics of the application that can be used to perform a correlation with the one or more static structural characteristics of the authorized application (e.g., stored in a memory of the security server and/or the application reference database 114) to determine the integrity of the application stored on the user device (e.g., 102(1)).

In some embodiments, the security engine may send a notification in the form of a warning to be displayed on the user device that is running an application that is identified to be unsecure by the security engine 104. If the security risk is above a predetermined threshold, the notification from the security engine 104 may deactivate the malicious application. Additional functionality of the security engine 104 of the security server 116 and its interaction with the user devices are discussed in more detail in a later section.

In one embodiment, the Customer Relationship Manager (CRM) server 118 offers its account holders (e.g., subscribers of the application integrity verification service) on-line access to a variety of information related to the account holders' account, such as on-line payment information, subscription changes, names of applications that have a high probability of being unsecure, and alternatives therefor. In one embodiment, the CRM server 118 includes the names and versions of all the programs that are stored on a user device associated with the account.

In one embodiment, the application reference database 114 may comprise virtual computing devices in the form of virtual machines or software containers that are hosted in a cloud, thereby providing an elastic architecture for processing and storage. For example, the application reference database 114 may be maintained by a security software company or a consortium of organizations and/or individuals interested in software security to provide an up-to-date resource for identifiable software libraries that represent potential security risk.

While the application reference database 114 has been illustrated by way of example to be separate from the security server 116, the functionality described herein with respect to the application reference database 114 and the security server 116 can also be provided by one or multiple different computing devices. In other words, the application reference database 114 and the security server 116 need not be a stand-alone computing devices but can be combined in various configurations.

Example Identification of Structural Characteristics

Figure 2A:
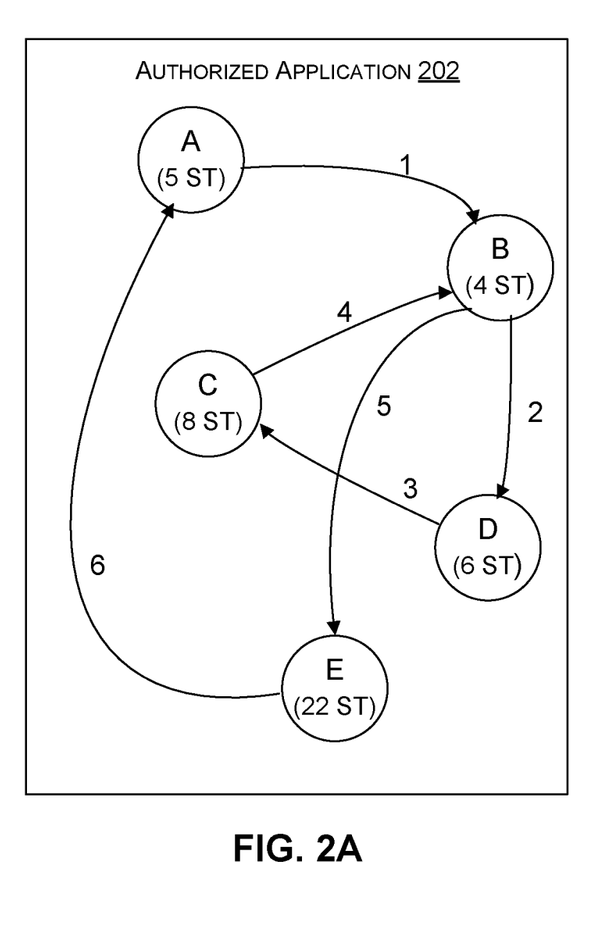
FIG. 2A illustrates an example of several structural characteristics of an authorized application.
Figure 2B:
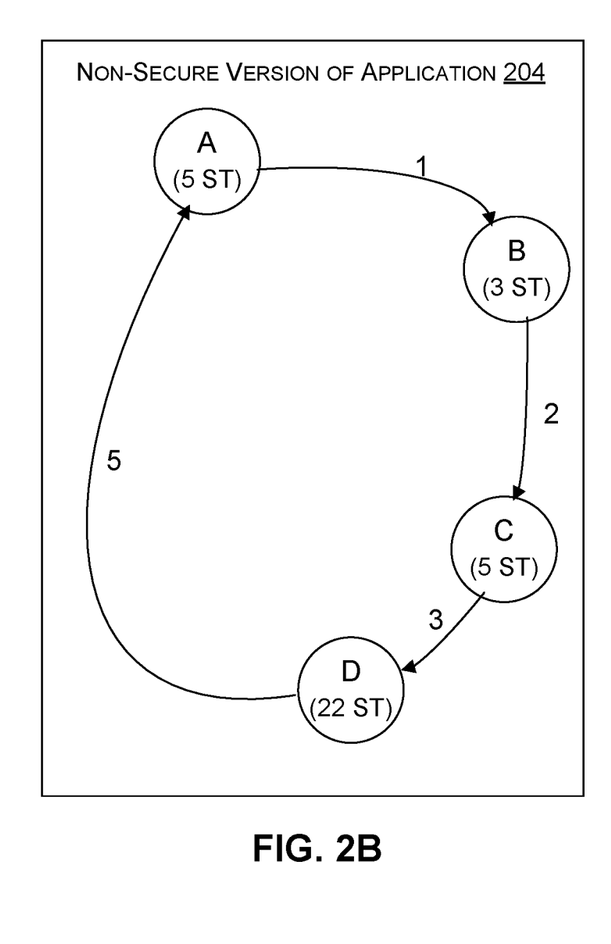
FIG. 2B illustrates an example of several structural characteristics of an unsecure version of the same application that is stored on a user device.

FIGS. 2A and 2B illustrate example structural characteristics of applications, multi-tier or otherwise. By way of illustrative example, FIG. 2A illustrates some structural characteristics of an authorized application 202, while FIG. 2B illustrates structural characteristics of an unsecure version of the same application that is stored on a user device. Thus, FIGS. 2A and 2B together illustrate differences in structural characteristics between two applications that may be used for integrity verification.

FIG. 2A illustrates an authorized application that may be provided by an authorized source. Several static structural characteristics can be extracted from the authorized application 202. Authorized application 202 includes six function calls with five different functions (i.e., functions A to E). The first function A has five statements; the second function B has four statements; the third function C has eight statements; the fourth function D has six statements, and the fifth function E has twenty-two statements. The authorized application uses the second function B twice, while the remaining functions A, C, D and E are used once. The order of the used functions is A, B, D, C, B, E, and A. Each of these structural characteristics (and others) can be used for correlation purposes. In some embodiments, one or more structural characteristics may have been previously injected by the security engine during a setup phase.

By way of contrast, FIG. 2B illustrates an unauthorized (e.g., unsecure) version of the same application 204 that has many static structural differences. The number of statements for functions B, C, and D are different. Further, each function is used only once. In addition, the unsecure version of the application 204 only has four functions (instead of the 5 in FIG. 2A). Still further, the order of the used functions is A, B, C, D, and A, which is different from the authorized application 202 of FIG. 2A.

In addition to the structural characteristics discussed in the context of FIGS. 2A and 2B above, other structural characteristics, which were previously stored in a reference table during the setup phase, may be used for the correlation as well, such as the length of a call stack at random lines in the application, a type and number of parameters passed to a function of the application; whether one or more injected structural characteristics are present in the application 204, etc.

In one embodiment, not all structural characteristics that are stored in the reference table for an authorized application 202 are evaluated. Rather, one or more characteristics are randomly selected by the security engine of the security server. By virtue of such random selection of structural characteristics, the security engine makes it more difficult for a nefarious application developer to reverse engineer the one or more criteria used for the integrity verification. Further, the response from the interrogated user device is simplified (e.g., in that it does not have to harvest and report on a long list of static structural characteristics of the application 204).

Example User Device

Figure 3:
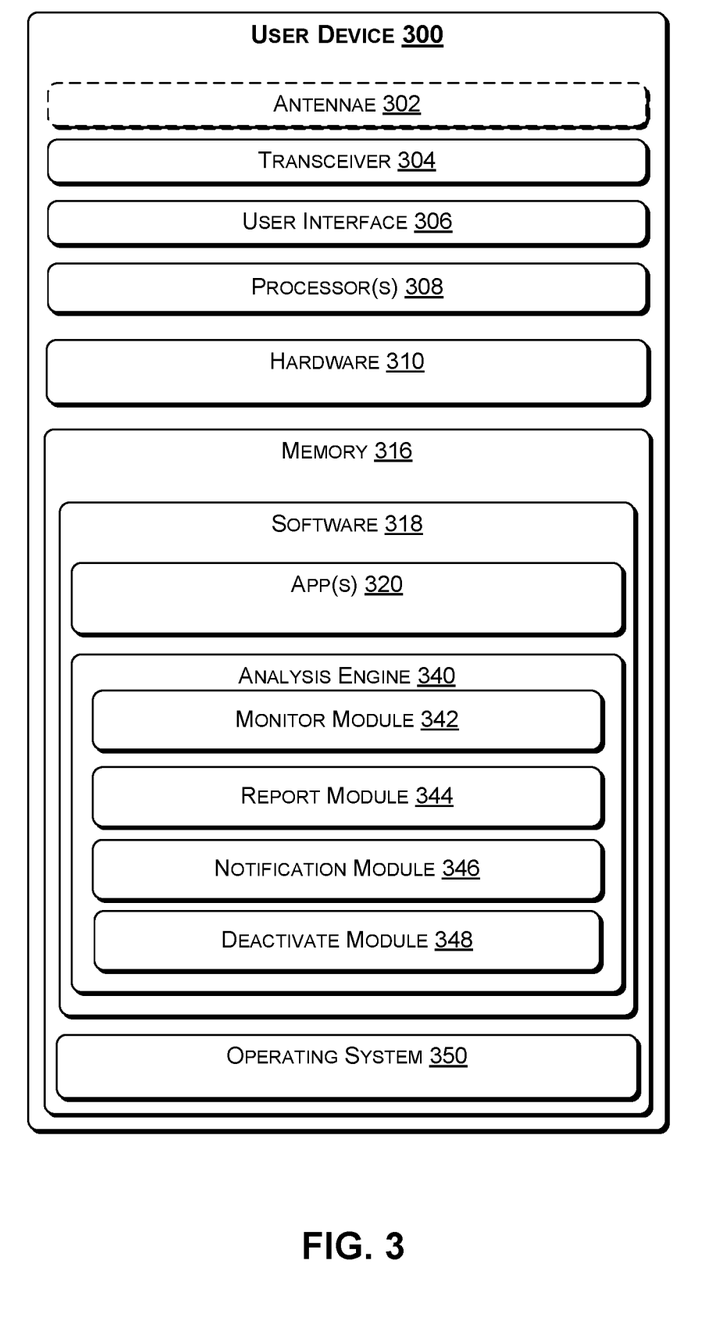
FIG. 3 illustrates a block diagram showing various components of an illustrative user device at a high level.

As discussed in the context of FIG. 1, the application integrity verification system in the architecture 100 involves several user devices. To that end, FIG. 3 illustrates a block diagram showing various components of an illustrative user device 300 at a high level. For discussion purposes, the illustration shows the user device 300 in the user device 200 in the form of a handheld smart-phone.

The user device 300 may include one or more antennae 302; a transceiver 304 for cellular, Wi-Fi, and/or wired communication; a user interface 306; one or more processors 308; hardware 310; and memory 316. In some embodiments, the antennae 302 may include an uplink antenna that sends radio signals to a base station, and a downlink antenna that receives radio signals from a base station of a mobile communication network. In some other embodiments, a single antenna may both send and receive radio signals. The same or other antennas may be used for Wi-Fi communication. These signals may be processed by the transceiver 304, sometimes collectively referred to as a network interface, which is configured to receive and transmit digital data. In one embodiment, the user device 300 does not include an antenna 302 and communication with external components is via wired communication.

In one embodiment, the user device 300 includes a user interface 306 that enables a user to provide input and receive output from the user device 300. For example, the user interface 306 may include a data output device (e.g., visual display, audio speakers, haptic device, etc.,) that may be used to display notifications from the security engine 104 of the security server 116. The user interface 306 may also include one or more data input devices. The data input devices may include, but are not limited to, combinations of one or more of keypads, keyboards, mouse devices, touch screens, microphones, speech recognition packages, and any other suitable devices or other electronic/software selection interfaces. For example, the data input devices may be used to download an application from the application store 110 (or update thereof) or to invoke various applications stored in the memory 316 of the user device 300.

The user device 300 may include one or more processors 308, which may be a single-core processor, a multi-core processor, a complex instruction set computing (CISC) processor, or another type of processor.

The hardware 310 may include a power source and digital signal processors (DSPs), which may include single-core or multiple-core processors. The hardware 310 may also include network processors that manage high-speed communication interfaces, including communication interfaces that interact with peripheral components. The network processors and the peripheral components may be linked by switching fabric. The hardware 310 may further include hardware decoders and encoders, a network interface controller, and/or a universal serial bus (USB) controller.

The memory 316 may be implemented using computer-readable media, such as computer storage media. Storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high definition video storage disks, or other optical storage, magnetic cassettes, magnetic tape, magnetic disk storage or other magnetic storage devices, or any other non-transmission medium that can be used to store information for access by a computing device.

The memory 316 may store various software components or modules that are executable or accessible by the processor(s) 308 and controller(s) of the user device 300. The various components of the memory 316 may include software 318 and an operating system 350. The software 318 may include various applications 320 that may have been downloaded from the application store(s) 110 and/or provided directly by an application developer 120. The software 318 may also include an analysis engine 340 having several modules. Each module may include routines, program instructions, objects, and/or data structures that perform particular tasks or implement particular abstract data types.

For example, the analysis engine 340 of the user device 300 may include a monitor module 342 configured to identify a runtime operation of an application. For example, the monitor module 342 may intercept an application when it is invoked (i.e., at runtime) and report this activity in a call to the security server 116 in the form of a data packet. In one embodiment, the data packet may include a name of the application and its version number. In some embodiments, the call to the security server 116 is performed directly by the application 320 during runtime (e.g., without interception from the monitor module 342 of the analysis engine 340).

The analysis engine 340 may include a report module 344 configured to respond to inquiries from the security engine 104 of the security server 116. For example, the security engine 104 may request one or more structural characteristics (that may be selected randomly from a reference table of the application reference database 114) of the subject application 320 during the runtime of the subject application 320. Put differently, the report module 344 is operative to respond to interrogations from the security engine 104 of the security server 116. In this regard, the report module 344 may perform static shape analysis to identify the requested structural characteristics of the application 320 and report the same to the security engine 104.

The analysis engine 340 may include a notification module 346 that is configured to receive notifications from the security engine 104 regarding whether the subject application stored in the memory 316 of the user device 300 poses a security concern. In this regard, a warning may be displayed on the user interface 306 of the user device 300. In some embodiments, the deactivate module 348 may deactivate the subject application 320 if it has been deemed to be unsecure.

The operating system 350 may include components that enable the user device 300 to receive and transmit data via various interfaces (e.g., user controls, communication interface, and/or memory input/output devices), as well as process data using the processor(s) 308 to generate output. The operating system 350 may include a presentation component that presents the output (e.g., display the data on an electronic display of the user device 300, store the data in memory 316, transmit the data to another electronic device, etc.). Additionally, the operating system 350 may include other components that perform various additional functions generally associated with an operating system 350.

Example Process

Figure 4:
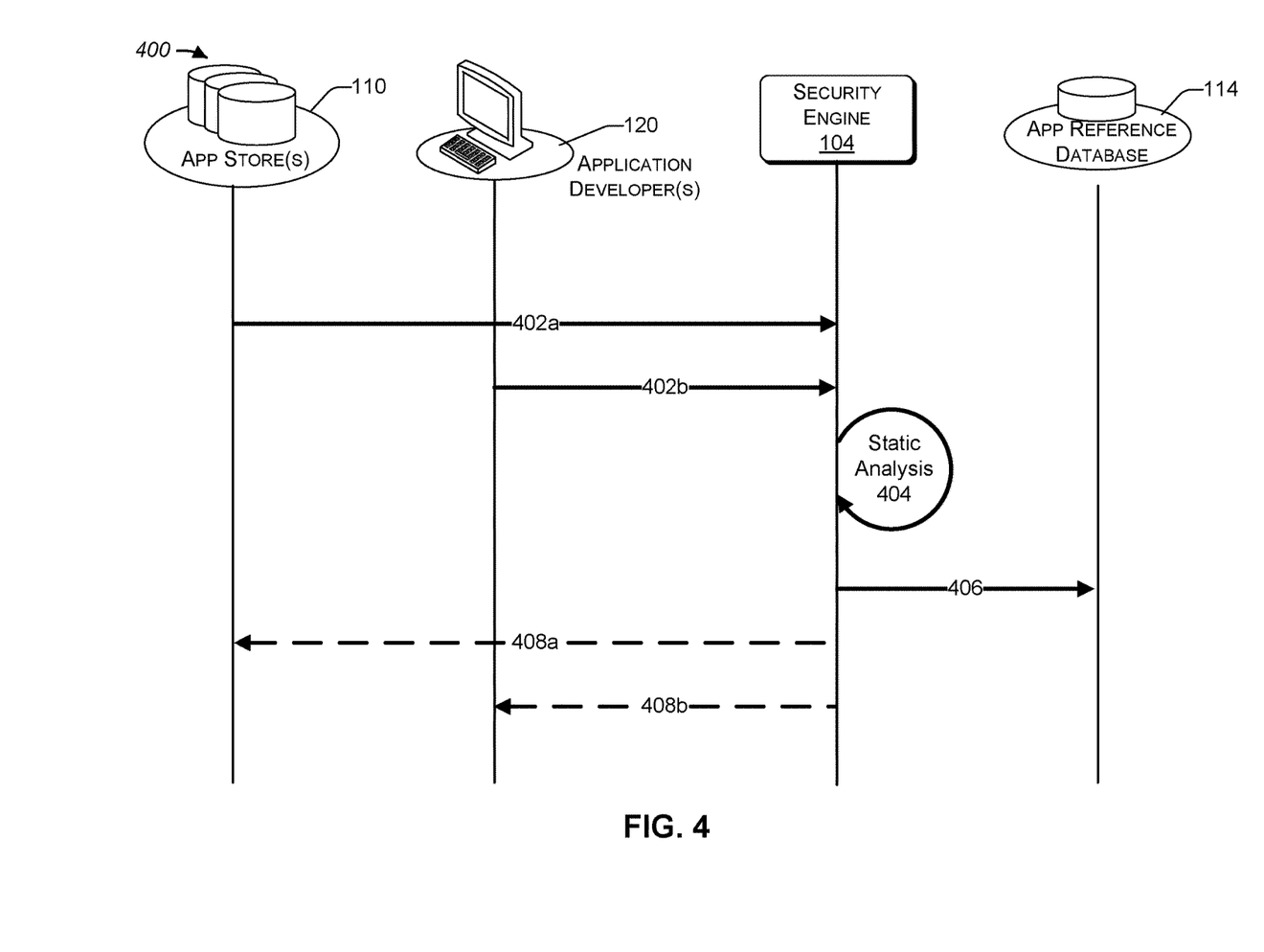
FIG. 4 presents an illustrative call flow process of a setup phase of providing an application integrity verification via a security engine, consistent with an exemplary embodiment.
Figure 5:
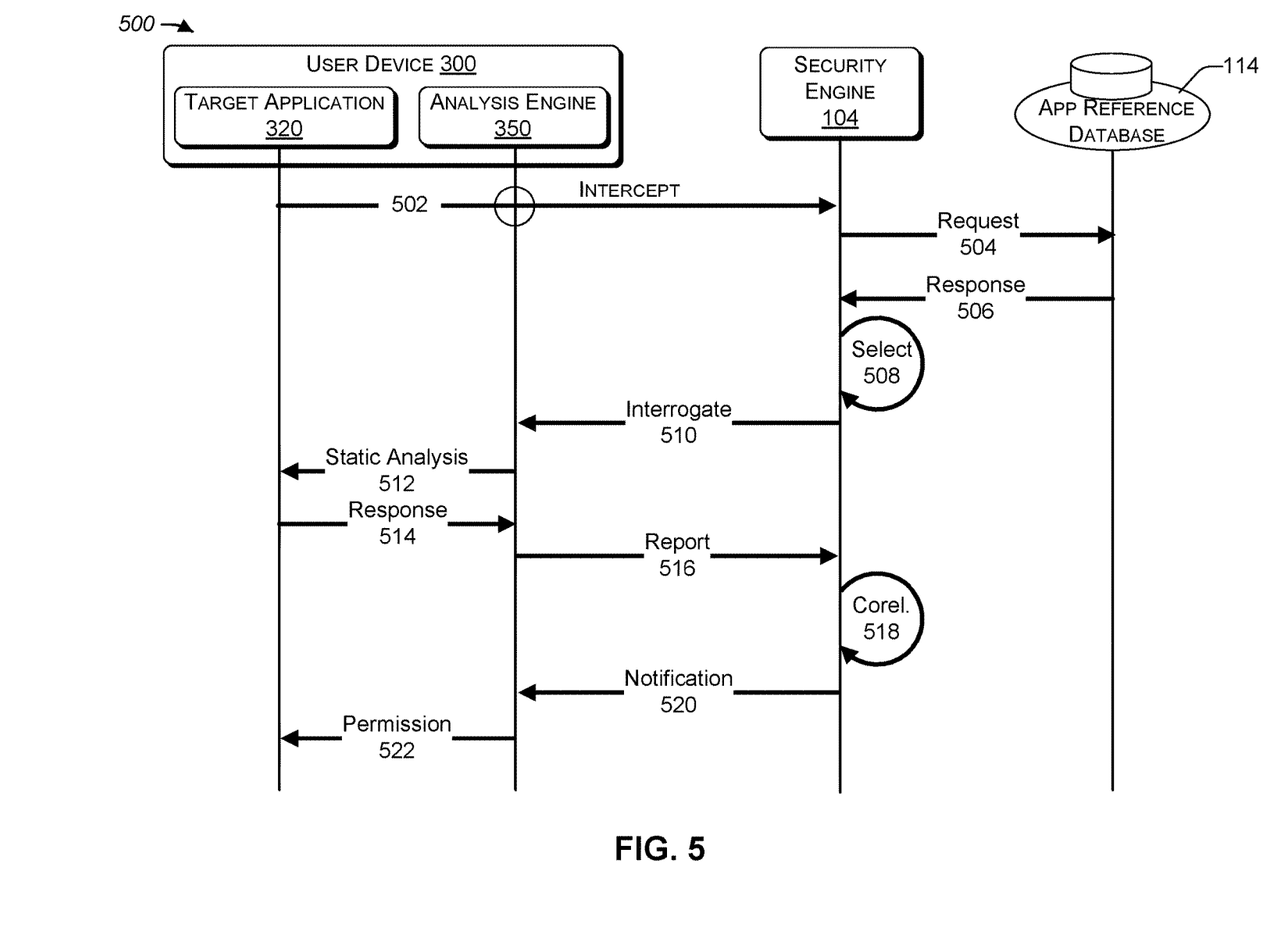
FIG. 5 presents an illustrative call flow process of an active phase of providing an application integrity verification via a security engine, consistent with an exemplary embodiment.

With the foregoing overview of the architecture 100 and the components of a user device 300, it may be helpful now to consider a high-level discussion of example call flow processes. To that end, FIGS. 4 and 5 present illustrative processes 400 and 500 for providing application integrity verification via a security engine 104 of a security server 116. Process 400 describes an example setup phase, while process 500 describes an example active phase of the application integrity verification.

Processes 400 and 500 are illustrated as a collection of blocks in logical call flows, wherein each call flow represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or performed in parallel to implement the process. For discussion purposes, the processes 400 and 500 are described with reference to the architecture 100 of FIG. 1.

At steps 402a and 402b, the security engine 104 of the security server 116 receives applications from various sources, such as application store(s) 110 and/or application developer(s), collectively referred to herein as secure sources. In various embodiments, the applications may be received at predetermined intervals (e.g., once per day), upon a trigger event (e.g., a new application is available at a secure source or developer), or upon request from the security engine 104. To facilitate the present discussion, it will be assumed that a single new application is provided from a secure source.

At step 404, upon receipt of the legitimate application from an authorized source, the security engine 104 performs static analysis of the application to identify various structural characteristics of the code of the application. In some embodiments, the security engine 104 may inject structural characteristics into the code, as discussed above.

At step 406, the identified structural characteristics of the application are stored in an application reference database 114 and/or memory of the security engine 104 for future reference. These entries provide a reference table of shape characteristics that may be unique to the authorized version of the target application. In some embodiments, the actual code of the target application is stored as well.

In one embodiment, if the target application is modified (e.g., has structural characteristics that were injected by the security engine 104), then at steps 408a and 408b, the security engine 104 sends the modified target application to the secure source (e.g., application store(s) 110 or application developer(s) 120 for distribution as an authorized version of the target application. This modified target application may then be provided to the application store(s) 110 and/or application developers 120 for distribution as an authorized version of the application. It will be understood that the target application is modified upon permission from the authorized source.

FIG. 5 illustrates an example active phase, where the integrity of a target application purporting to be authentic is verified. For example, this target application may have been downloaded by an operator of the user device 300 under the assumption that the target application is an authorized version. During a runtime operation of the target application 320, the integrity of the target application 320 may be verified by the security engine 104.

In step 502, a call is received by the security engine 104 of the security server 116 from the user device 300. In various embodiments, the call may originate directly from the target application 320, as it attempts to use various services of the security server 116 and/or other databases (e.g., 112 in FIG. 1) in the multi-tier architecture of the target application 320, or may be intercepted by the analysis engine 340 during a runtime of the target application 320.

Upon receiving the call from the user device 300, the security engine attempts to identify the integrity of the target application 320. To that end, in step 504, the security engine 104 sends a request to receive static structural characteristics of the target application that were previously stored in the reference table of the application reference database 114.

In step 506, the security engine 104 receives the requested static structural characteristics of the secure version of the target application 320 from the application reference database 114.

In some embodiments, in step 508, the static structural characteristics to be used for interrogating the target application 320 of the user device 300 are selected randomly by the security engine 104. For example, the reference table of the application reference database 114 may provide many (e.g., dozens) of stored static structural characteristics of an authorized (i.e., secure) version of the target application 320. From those static structural characteristics, one or more are chosen randomly to be used as an interrogation vehicle against the target application 320 of the user device 300. In other embodiments, all static structural characteristics from the application reference database 114 related to the target application 320 are used for correlation. Such exhaustive approach may be warranted when the security of the application is of particular importance (e.g., credit card, bank information, etc., is involved), or when the number of available static structural characteristics is below a predetermined threshold.

In step 510, the security engine 104 interrogates the user device 300 by sending a request to static structural characteristics of the target application 320.

In step 512, the analysis engine 350 of the user device 300 performs static analysis of the target application 320 to harvest therefrom (i.e., in step 514) the requested static structural characteristics.

In step 516, the requested static structural characteristics are reported to the security engine 104.

In step 518, the security engine 104 compares the static structural characteristics of the target application 320 with the static structural characteristics of the secure version received from the application reference database 114. Upon determining that the report from the user device 300 does not include a match for the one or more requested features, the security engine 104 identifies that the version of the target application 320 to be unsecure. However, upon determining that the report does include a match for the requested features, the version of the target application is identified be secure.

In step 520, a message is sent to the analysis engine 350 of the user device 300 with instructions based on the results of the correlation of step 518. For example, if the target application 320 is deemed to be secure, then in step 522, the analysis engine 350 provides the target application 320 permission to interact with the security engine 104 or other suitable databases without restriction.

However, if the target application 320 is deemed to be unsecure, then the notification in step 520 may include a warning to be displayed on the user device 300. If the security risk is above a predetermined threshold, the notification from the security engine 104 may include instructions (i.e., in step 522) to remove any permissions of the target application 320 and/or to deactivate the target application 320. In various embodiments, deactivation may include quarantining the target application 320 or discarding the application and providing a suitable message on the display of the user device 300.

Example Computer Platform

Figure 6:
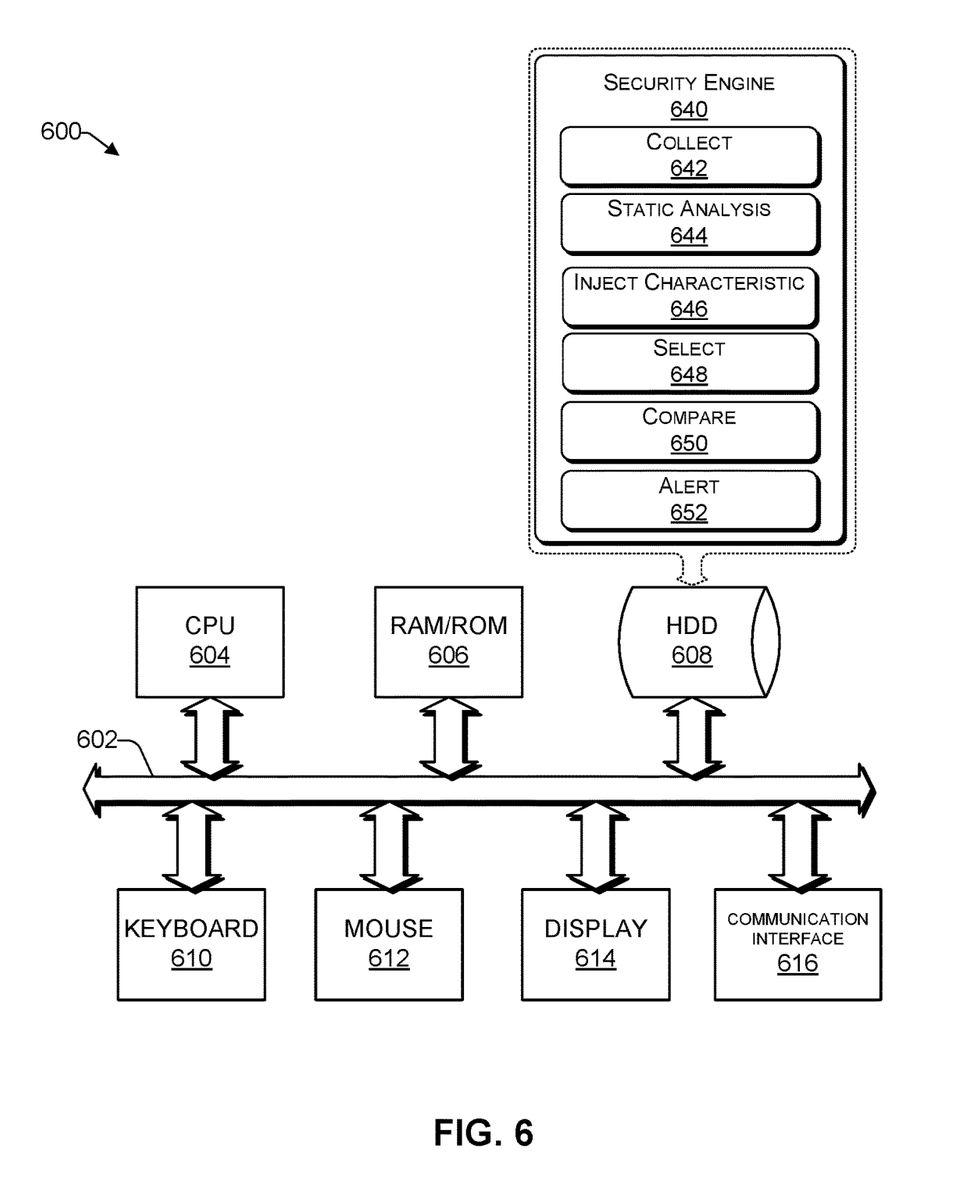
FIG. 6 provides a functional block diagram illustration of a computer hardware platform that may be used to implement the security server, consistent with an exemplary embodiment.

As discussed above, functions relating to providing application integrity verification can be performed with the use of one or more computing devices connected for data communication via wireless or wired communication, as shown in FIG. 1 and in accordance with the processes of FIGS. 4 and 5. An exemplary computing device in the form of a user device 300 has been discussed above with respect to FIG. 3. FIG. 6 provides a functional block diagram illustration of an example computer hardware platform. In particular, FIG. 6 illustrates a network or host computer platform 600, as may be used to implement the security server 116 of FIG. 1.

The computer platform 600 may include a central processing unit (CPU) 604, random access memory (RAM) and/or read only memory (ROM) 606, a hard disk drive (HDD) 608, a keyboard 610, a mouse 612, and display 614, which are connected to a system bus 602.

In one embodiment, the HDD 608, has capabilities that include storing a program that can execute various processes, such as security engine 640, in a manner described herein. The security engine 640 may have various modules configured to perform different functions.

For example, the security engine 640 may include a collect module 642 operative to receive applications from various secure sources, as described herein. There may be a static analysis module 644 operative to identify various static structural characteristics of an application. There may be an inject characteristics module 646 operative to introduce one or more structural characteristics into an authorized application before it is sent to an authorized source for general distribution.

The security engine 640 may also include a select module 648 operative to select one or more structural characteristics of an authorized application for interrogation of another application purporting to be secure. In one embodiment, the select module 648 has a randomizing algorithm operative to make random the selection of structural characteristics from a pool of available structural characteristics.

There may be a compare module 650 operative to determine whether there is a match between one or more selected static structural characteristics of a secure application and a version running on a user device. There may also be an alert module 652 operative to alert one or more recipients of a security concern regarding an application that has been identified to pose a security concern.

In one example a program, such as Apache™, can be stored for operating the system as a Web server. In one embodiment, the HDD 608 can store an executing application that includes one or more library software modules, such as those for the Java™ Runtime Environment program for realizing a JVM (Java™ virtual machine).

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computing device comprising:
a processor;
a network interface coupled to the processor to enable communication over a network;
a storage device for content and programming coupled to the processor;
a security engine software stored in the storage device, wherein an execution of the security engine software by the processor configures the computing device to perform acts comprising:
in a setup phase:
receiving an authorized application from an authorized source;
performing static analysis on the authorized application to identify a plurality of structural characteristics; and
storing the plurality of structural characteristics; and
in an active phase:
receiving a call from a user device having a target application purporting to be a version of the authorized application, during a runtime of the target application;
selecting one or more structural characteristics from the plurality of structural characteristics;
requesting from the user device to provide the selected one or more structural characteristics from the target application;
receiving a report from an analysis engine of the user device in response to the request;
upon determining that the report does not provide a match between the selected one or more structural characteristic of the authorized application and the target application, identifying the version of the target application to be unsecure; and
upon determining that the report does provide the match between the selected one or more structural characteristic of the authorized application and the target application, identifying the version of the target application to be secure;
wherein:
during the setup phase, the plurality of structural characteristics of the authorized application are stored in a reference table of a reference database; and
during the active phase, the plurality of structural characteristics of the authorized application are retrieved from the reference table in response to receiving the call from the user device.

2. The computing device of claim 1, wherein the plurality of structural characteristics includes one or more of the following characteristics:
a number of statements in a function of the authorized application;
a length of a call stack at a predetermined line in the authorized application;
a type and number of parameters passed to a function of the authorized application;
a number of functions used in the authorized application;
a number of times each function is used in the authorized application; and
an order of an invocation of each function in the authorized application.

3. The computing device of claim 1, wherein execution of the security engine software further configures the computing device to perform acts comprising:
upon identifying that the version of the target application to be unsecure, sending a notification over the network interface to an analysis engine of the user device to at least one of:
provide a warning on a user interface of the user device indicative that the target application is unsecure; and
deactivate the target application.

4. The computing device of claim 1, wherein the call is initiated by an analysis engine application of the user device.

5. The computing device of claim 1, wherein execution of the security engine software further configures the computing device to perform acts comprising: upon identifying that the version of the target application is secure, sending a notification to an analysis engine of the user device indicative that the target application is secure.

6. The computing device of claim 1, wherein execution of the security engine software further configures the computing device to perform acts comprising, in a setup phase:

upon receiving the authorized application, injecting a structural characteristic into the authorized application; and sending the authorized application to the authorized source for distribution.

7. The computer device of claim 1, wherein the one or more structural characteristics from the plurality of structural characteristics are selected randomly by the security engine in the active phase.

8. A non-transitory computer readable storage medium tangibly embodying a computer readable program code having computer readable instructions that, when executed, causes a computer device to carry out a method of verifying an integrity of an application, the method comprising:

in a setup phase:

receiving an authorized application from an authorized source;

performing static analysis on the authorized application to identify a plurality of structural characteristics; and storing the plurality of structural characteristics; and in an active phase:

receiving a call from a user device having a target application purporting to be a version of the authorized application, during a runtime of the target application;

selecting one or more structural characteristics from the plurality of structural characteristics;

requesting from the user device to provide the selected one or more structural characteristics from the target application;

receiving a report from an analysis engine of the user device in response to the request;

upon determining that the report does not provide a match between the selected one or more structural characteristic of the authorized application and the target application, identifying the version of the target application to be unsecure; and upon determining that the report does provide the match between the selected one or more structural characteristic of the authorized application and the target application, identifying the version of the target application to be secure;

wherein:

during the setup phase, the plurality of structural characteristics of the authorized application are stored in a reference table of a reference database; and during the active phase, the plurality of structural characteristics of the authorized application are retrieved from the reference table in response to receiving the call from the user device.

9. The non-transitory computer readable storage medium of claim 8, wherein the plurality of structural characteristics includes one or more of the following characteristics:

a number of statements in a function of the authorized application;

a length of a call stack at a predetermined line in the authorized application;

a type and number of parameters passed to a function of the authorized application;

a number of functions used in the authorized application;

a number of times each function is used in the authorized application; and an order of an invocation of each function in the authorized application.

10. The non-transitory computer readable storage medium of claim 8, the method further comprising:

upon identifying that the version of the target application to be unsecure, sending a notification over a network interface to an analysis engine of the user device to at least one of:

providing a warning on a user interface of the user device indicative that the target application is unsecure; and deactivating the target application.

11. The non-transitory computer readable storage medium of claim 8, the method further comprising: upon identifying that the version of the target application is secure, sending a notification to an analysis engine of the user device indicative that the target application is secure.

12. The non-transitory computer readable storage medium of claim 8, the method further comprising, in a setup phase:

upon receiving the authorized application, injecting a structural characteristic into the authorized application; and sending the authorized application to the authorized source for distribution.

13. The non-transitory computer readable storage medium of claim 8, wherein the one or more structural characteristics from the plurality of structural characteristics are selected randomly by the security engine in the active phase.

14. A method of verifying an integrity of an application, the method comprising:

in a setup phase:

receiving an authorized application from an authorized source;

performing static analysis on the authorized application to identify a plurality of structural characteristics; and storing the plurality of structural characteristics; and in an active phase:

receiving a call from a user device having a target application purporting to be a version of the authorized application, during a runtime of the target application;

selecting one or more structural characteristics from the plurality of structural characteristics;

requesting from the user device to provide the selected one or more structural characteristics from the target application;

receiving a report from an analysis engine of the user device in response to the request;

upon determining that the report does not provide a match between the selected one or more structural characteristic of the authorized application and the target application, identifying the version of the target application to be unsecure; and upon determining that the report does provide the match between the selected one or more structural characteristic of the authorized application and the target application, identifying the version of the target application to be secure;

wherein:

during the setup phase, the plurality of structural characteristics of the authorized application are stored in a reference table of a reference database; and during the active phase, the plurality of structural characteristics of the authorized application are retrieved from the reference table in response to receiving the call from the user device.

15. The method of claim 14, wherein the plurality of structural characteristics includes one or more of the following characteristics:
   a number of statements in a function of the authorized application;
   a length of a call stack at a predetermined line in the authorized application;
   a type and number of parameters passed to a function of the authorized application;
   a number of functions used in the authorized application;
   a number of times each function is used in the authorized application; and
   an order of an invocation of each function in the authorized application.

16. The method of claim 14, further comprising:
   upon identifying that the version of the target application to be unsecure, sending a notification over a network interface to an analysis engine of the user device to at least one of:
   providing a warning on a user interface of the user device indicative that the target application is unsecure; and
   deactivating the target application.

17. The method of claim 14, further comprising, in a setup phase:
   upon receiving the authorized application, injecting a structural characteristic into the authorized application; and
   sending the authorized application to the authorized source for distribution.

18. The method of claim 14, wherein the one or more structural characteristics from the plurality of structural characteristics are selected randomly by the security engine in the active phase.

* * * * *